United States Patent [19]
Frederic

[11] Patent Number: 5,953,041
[45] Date of Patent: *Sep. 14, 1999

[54] IMAGE ANALYZER AND PRINTER WITH SHARED IMAGE SCANNING APPARATUS

[75] Inventor: Alain Frederic, Eragny S/oise, France

[73] Assignee: Sagem SA, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 08/822,868

[22] Filed: Mar. 24, 1997

[30] Foreign Application Priority Data

Mar. 26, 1996 [FR] France ................................. 96 03725

[51] Int. Cl.$^6$ ....................................... H04N 1/04
[52] U.S. Cl. .................... 347/260; 347/243; 358/481; 358/474
[58] Field of Search ................................ 347/225, 231, 347/238, 260, 243; 358/425, 472, 474, 481, 483, 480

[56] References Cited

U.S. PATENT DOCUMENTS 4,358,793  11/1982  Hosaka et al. .......................... 358/480
5,132,833   7/1992  Diau ........................................ 359/221

FOREIGN PATENT DOCUMENTS 0 028 845 A1  11/1980  European Pat. Off. .
0 505 969 A2   3/1992  European Pat. Off. .
   77 15269    5/1977  France .
  2 673 738    3/1991  France .............................. G06K 9/18

Primary Examiner—N. Le
Assistant Examiner—Hai C. Pham
Attorney, Agent, or Firm—McDermott, Will & Emery

[57] ABSTRACT

An item of office equipment, such as a facsimile machines, is provided having image analysis and laser printing capabilities with a shared mechanical image scanning apparatus. Embodiments include a single assembly with an analysis head and a laser emitting source disposed facing each other, a revolving mirror interposed between them, and first and second returning mirrors disposed symmetrically with respect to a line along which the analyzing head and the laser emitting source are disposed, such that the revolving mirror is located substantially at a point constituting an operational centre of symmetry of the single assembly. This symmetrical design allows the single analysis/printing assembly to be structurally simple and compact, enables the number of photosensors and LEDs necessary for image analysis to be reduced to as few as one of each, and eliminates the need for analog shift registers, thus decreasing the cost, size and complexity of the device.

6 Claims, 1 Drawing Sheet

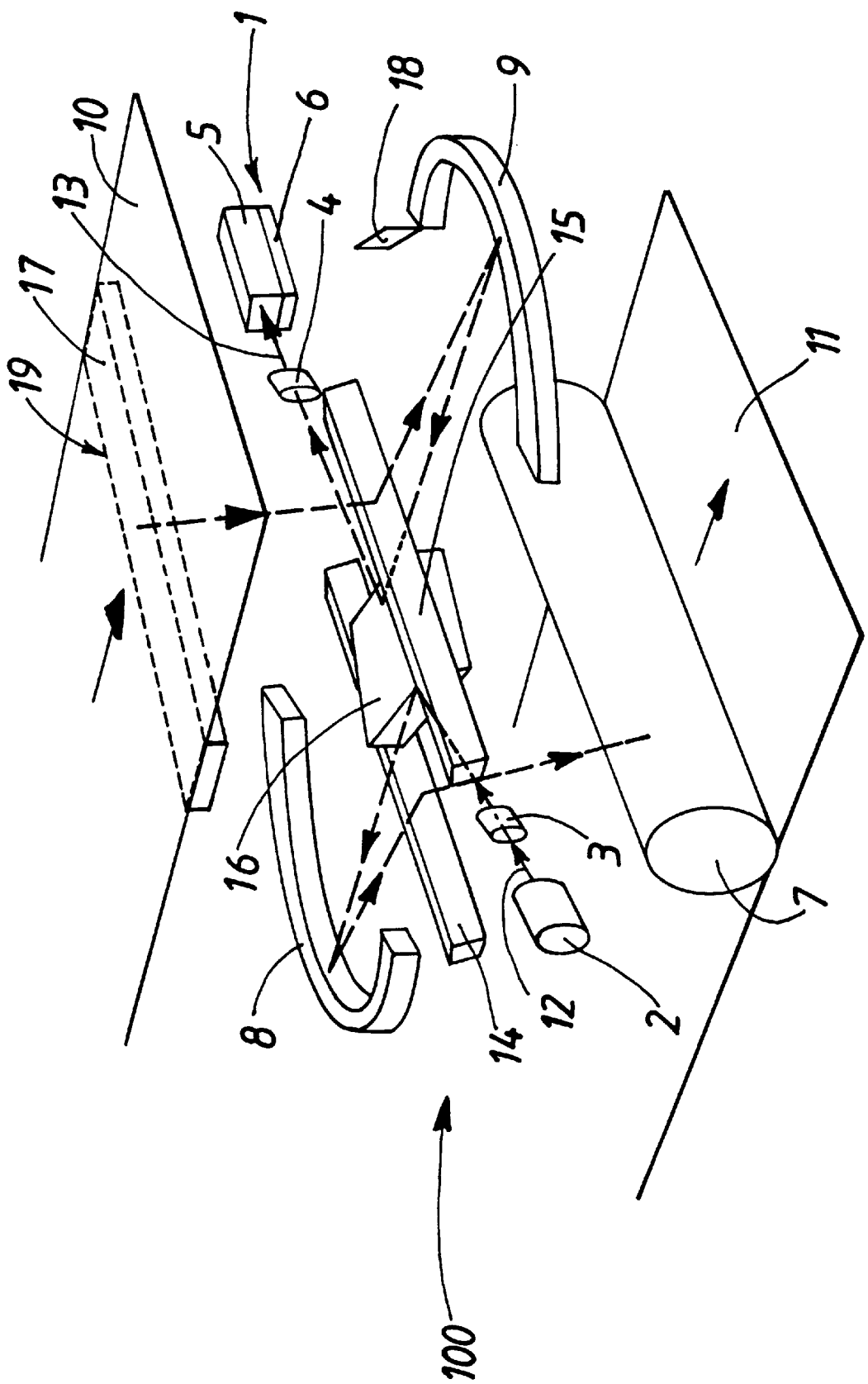

IMAGE ANALYZER AND PRINTER WITH SHARED IMAGE SCANNING APPARATUS

FIELD OF THE INVENTION

The present invention relates to an image analyzing and printing apparatus. More particularly, the present invention relates to facsimile machines and other office equipment which incorporate image analyzers and laser printers.

BACKGROUND ART

In order to receive or transmit a still image from or over a distance, a facsimile machine is provided with an image analysis unit, an image restitution unit, generally a printer, an image signal processing unit and an image signal transmission and reception unit.

An image analyzer (scanner), designed to translate visual information contained in the image into electrical signals, comprises a sensor and an image illuminating system, such as a fluorescent tube or a linear array of light-emitting diodes (LEDs).

The image sensor may be produced using:
 either a linear array of photosensors, charge transfer phototransistors also known as CCDs (Charge Coupled Devices), for example, associated with a focusing lens, and designed to analyze the illuminated image line by line as it is moved,
 or a linear array of photosensors on the scale of* a CIS (Contact Image Sensor), also designed to analyze the illuminated image as it is moved.

In order to transmit the image data which has been analyzed in this way, the photosensors are associated with analog shift registers.

The printer, more particularly a laser printer, is provided with a system for laser illumination of a photosensitive print drum, with the illuminating system comprising either a linear array of light-emitting diodes (LEDs), or one light-emitting diode which is associated with mechanical means for optical scanning, using a revolving mirror for example.

The revolving mirror, linear arrays of photosensors, focusing lens, analog shift registers and linear arrays of light-emitting diodes are costly elements of the image analyzer and the laser printer, and this increases the cost of the facsimile machine.

Items of office equipment with image analyzers and printers are known wherein the analyzing and printing scans are both carried out by means of a single laser emitting source.

Thus, in EP-A-0 028 845, the laser beam emitted by the single source is split into two beams, for printing and analysis respectively.

In U.S. Pat. No. 5,132,833 and FR-A-2 391 612, the laser beam is diverted, either for analysis or for printing, by means of a dual-position 'switch'.

However such prior art devices have the drawback of being structurally complex and unwieldy.

SUMMARY OF THE INVENTION

The present invention is intended to reduce the cost of the facsimile machine and other items of office equipment which incorporate image analyzers and laser printers.

To this end, the invention relates to an item of office equipment including image analysis means comprising photosensor means associated with mechanical means for optical image scanning, and means for the laser printing of images, with the analysis means and the printing means incorporated in a single analysis and printing assembly provided with mechanical scanning means for both analysis and printing comprising a revolving mirror with at least one side, the device being characterized in that the revolving mirror is located substantially at a point constituting an operational centre of symmetry of the single assembly.

Thanks to the invention, the number of photosensors may be considerably reduced, to as few as one cell, thus reducing the cost of the device compared to prior art devices with their multiple and costly photosensors in CCD or CIS linear arrays. The analog shift registers, which are equally expensive, are not needed.

In addition, as a result of the location of the revolving mirror, the single assembly is structurally simple and compact.

Also preferably, the device of the invention is provided with an electronic clock for modulating the printing speed.

Thus the speed of the clock may be made dependent on that of the laser beam on the print drum.

The photosensor means for image analysis may comprise a photosensor associated with a focusing lens.

Advantageously, a single light-emitting diode illuminates the image to be analyzed. In this way, the linear array of light-emitting diodes which enables illumination of the image being analyzed in devices available on the market is replaced with a single light-emitting diode, which further reduces the cost of the device of the invention.

Finally, there may be provided a common motor feeding the paper for printing and feeding the paper for analysis.

BRIEF DESCRIPTION OF THE DRAWINGS

The FIGURE is an exploded perspective view of an item of office equipment according to the present invention.

DESCRIPTION OF THE PREFERRED EMBODIMENT

A better understanding will be gained of the invention by means of the following description of a preferred embodiment of the item of office equipment, reference being made to the sole Figure which shows an exploded perspective view of the item of office equipment.

It should first of all be noted, in order to simplify the description, that apart from a print drum 7 and an analysis glass 19, all the operating elements described hereafter are located in a single plane of production. In addition, this plane of production is 'sandwiched' between a plane of analysis and a plane of printing which bear, respectively, paper for analysis 10 and paper for printing 11.

The item of office equipment comprises means for the analysis of images and means for the laser printing of images.

The analysis means comprise a fixed analyzing head 1, provided with a source of illumination 6 of the paper to be analyzed 10, in this case a light-emitting diode (LED), and with a phototransistor 5 for the photosensing of a surface element of the paper to be analyzed 10 illuminated by the LED 6. A focusing lens 4 is associated with the analyzing head 1 so as to focus onto the sensing surface of the phototransistor 5 an analyzing light beam 13 emitted from the illuminated surface element.

The printing means comprise a laser diode 2 for emitting a laser printing beam 12 designed to strike a print drum 7, and a focusing lens 3 for the laser printing beam 12, associated with the laser diode 2.

The analyzing head 1 and the laser diode 2 are arranged facing one another, with the analyzing beam 13 received by the analyzing head 1 and the printing beam 12 emitted by the diode 2 substantially along the same leading line of the production plane, in the same direction.

In addition, the device is provided with mechanical means for the optical scanning of images for analysis and for printing.

The mechanical means for optical scanning of the paper to be analyzed 10 comprise a revolving mirror 16, here a 6-sided polygon, fitted between the analyzing head 1 and the laser diode 2, a returning mirror 15, in this case an elongated parallelepiped whose longitudinal axis is parallel to the leading line and which adjoins said line, and a correcting mirror 9, semi-annular in shape, the returning mirror 15 being disposed near the revolving mirror 16, between the latter and the correcting mirror 9.

The LED 6 attached in this case to the analyzing head 1 can emit an illuminating beam, which will follow the same trajectory, in the opposite direction, as the analyzing beam 13. The optical scanning means described above are arranged so that the analyzing beam 13, emitted from the illuminated surface element of the paper to be analyzed 10 runs along a trajectory passing, in succession, via the returning mirror 15, the angle correcting mirror 9, the revolving mirror 16 and the focusing lens 4, before illuminating the analyzing head 1 for photosensing.

In order for the illuminating beam, and so the analyzing beam 13, to scan the paper to be analyzed 10, the revolving mirror 16 may be rotated around its centre, and may during its rotation divert the illuminating beam which in this way illuminates, one after the other, the surface elements constituting a line 17 of the paper 10, and this takes place for each successive line. The analysis glass 19 covers the line to be analyzed 17 in order to optimize sensing and the paper to be analyzed 10 may, during analysis, be translated into the plane of analysis.

The mechanical means for optical scanning of the paper to be printed 11 comprise the revolving mirror 16, a returning mirror 14 and an angle correcting mirror 8, the latter two mirrors 14 and 8 being the respective symmetrical figures for the mirrors 15 and 9, across the leading line.

The means for optical scanning of the paper to be printed 11 are arranged such that the printing beam 12 emitted by the laser diode 2 runs along a trajectory passing, in succession, via the focusing lens 3, the revolving mirror 16, the correcting mirror 8 and the returning mirror 14, before striking the drum 7 for printing the paper 11 bearing against the latter. To scan the paper 11 to be printed, the revolving mirror 16 may be rotated around its centre, and so may divert the trajectory of the printing beam 12, such that the point of impact of the beam 12 on the print drum 7 runs along the points of a generating line of the drum 7 one after another, and this occurs for each generating line. During the printing, the drum 7 is rotated and the paper to be printed 11 is simultaneously translated in the plane of printing, in the direction resulting from the rotation of the print drum 7.

The returning mirrors 14, 15 are provided to direct the various light beams. By means of the correcting mirrors 8, 9 it is possible to correct angular errors brought about by scanning during printing or during analysis.

It should be noted at this stage of the description that the print drum 7, the analysis glass 19, the rotating mirror 16, the returning mirrors 14 and 15, the correcting mirrors 8 and 9, together with the analyzing head 1 and the laser diode 2, associated respectively with the focusing lenses 3 and 4, form a single analysis and printing assembly 100. This single assembly incorporates mechanical means for optical scanning for both analysis and printing comprising the revolving mirror 16.

It should in addition be emphasized that the revolving mirror 16 is located substantially at a point constituting an operational centre of symmetry of the single assembly.

The device also comprises an electronic clock, not shown on the Figure, which serves during printing to modulate the speed of output of the points to be printed from one end of a line to the other, the speed of the clock being made dependent on the speed of the printing beam 12 on the print drum 7. In this way the speed of the beam outputting points to be printed may be made constant over the drum 7.

A photosensitive cell 18, attached to one end of the correcting mirror 9 makes it possible, during the analysis, to sense the moment at which the illuminating beam and the analyzing beam 13 reach the end of a line being analyzed, and then orders a line synchronization.

Finally the device incorporates a joint motor for analysis and for printing, feeding the paper for analyzing 10 and the paper for printing 11, as disclosed for example in the patent FR-A-2 684 509.

The device described above may be associated with other devices, such as an assembly comprising a unit for the reception and transmission of facsimile data and a unit for processing these data, the whole apparatus forming a facsimile machine.

In this case, the device of the invention can carry out the printing of facsimiles received.

For this purpose, the laser diode 2 emits, through the focusing lens 3, the printing beam 12 which strikes the print drum 7, having been reflected successively off the revolving mirror 16, the correcting mirror 8 and the returning mirror 14. The revolving mirror 16 and the drum 7 are rotated and the paper for printing 11 is translated by the joint motor.

The device can also in this case analyze a facsimile to be transmitted. For this purpose, the analyzing head 1 illuminates each surface element on the paper 10, in this case the facsimile, with the LED 6 emitting the illuminating beam to illuminate the surface elements of the facsimile 10 one after another, the illuminating beam having been reflected successively off the revolving mirror 16, the correcting mirror 9 and the returning mirror 15. The paper 10 is translated by the joint motor. The illuminated surface element returns the analyzing beam 13 which, having been reflected successively off the returning mirror 15, the correcting mirror 9 and the revolving mirror 16, and having been focused through the lens 4, illuminates the sensing surface of the phototransistor 5 of the analyzing head 1.

The device may, furthermore, serve as a local copier, analyzing and printing a document almost at the same time.

In another embodiment, the LED 6 of the analyzing head 1 is replaced with a linear array of lower power LEDs, adjoining the analysis glass 19.

It would also have been possible to envisage the use of a revolving mirror with one, two or more sides.

Finally electronic angle correcting means may be provided, in which case the mirrors 8 and 9 would not be correcting mirrors.

I claim:

1. An item of office equipment including image analysis means comprising photosensor means associated with mechanical means for optical image scanning, and means for laser printing of images, the analysis means and the printing means incorporated in a single analysis and printing assembly with mechanical scanning means for both analysis and printing, of the images the mechanical scanning means comprising a revolving mirror with at least one side;

wherein the analysis means comprises an analysis head and a first returning mirror, the photosensor means being integral with the analysis head, and the printing means comprises a laser emitting source and a second returning mirror; and wherein the analysis head and the laser emitting source are facing each other, the revolving mirror is interposed between the analysis head and the laser emitting source, and the first and second returning mirrors are symmetrical with respect to a line along which the analyzing head and the laser emitting source are disposed, such that the revolving mirror is located substantially at a point constituting an operational centre of symmetry of the single assembly.

2. An item of office equipment as claimed in claim 1, wherein there is provided an electronic clock for modulating a printing speed by the printing means.

3. An item of office equipment as claimed in claim 1, wherein the photosensor means for image analysis are associated with a focusing lens.

4. An item of office equipment as claimed in claim 1, wherein there is provided a single light-emitting diode illuminating the images to be analyzed.

5. An item of office equipment as claimed in claim 1, wherein there is provided a linear array of light-emitting diodes illuminating the images to be analyzed.

6. An item of office equipment as claimed in claim 1, wherein there is provided a common motor feeding the paper for printing by the printing means and feeding paper for analysis.

* * * * *